March 1, 1966  TOKUO ASANO  3,237,965

ACCELERATOR AID FOR BICYCLE AND AUTO-BICYCLE

Filed May 4, 1964

INVENTOR.

Tokuo Asano 3,237,965
ACCELERATOR AID FOR BICYCLE AND
AUTO-BICYCLE
Tokuo Asano, 1280 Otobe, Niezaki-cho,
Tsu-shi, Mie-ken, Japan
Filed May 4, 1964, Ser. No. 364,489
1 Claim. (Cl. 280—217)

This invention relates to an aid for accelerating bicycles, auto-bicycles and the like, and more particularly to a bicycle or auto-bicycle wheel on which is mounted a weight for aiding the smooth acceleration thereof and also to a bicycle or auto-bicycle having such a wheel.

There have been made various proposals relating to the acceleration of bicycles, auto-bicycles and the like (herein after referred generally to "bicycle"). Most of these conventional proposals have been directed to change in design or structure of bicycle or improvements of the power transmission mechanism or engine. However, they are complicated in construction or expensive.

Therefore, it is an object of this invention to provide means for smoothly accelerating bicycles which is simple in construction and is inexpensive.

It is another object of this invention to provide an improved bicycle wheel which is simple and inexpensive and which is effective to aid in accelerating the bicycle without any additional modification such as of driving mechanism, power transmission mechanism or engine (in case of auto-bicycle).

It is also an object of this invention to provide a bicycle provided with a wheel of the type described above.

Other objects, features and advantages of the invention will be apparent from the following description which will be made by referring to the accompanying drawings wherein.

Briefly the above and other objects of the invention are accomplished by mounting a plurality of weight blocks on a rim, said weight blocks being arranged diametrically opposed or symmetrically on diameter through the center of the wheel.

Figure 1:
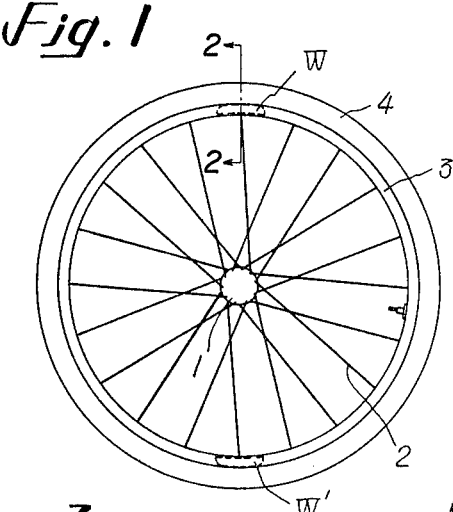
FIG. 1 is a schematic view of a wheel embodying the present invention.

Referring to the drawing, more particularly FIG. 1, there is schematically shown a conventional bicycle or auto-bicycle wheel comprising a shaft 1, spokes 2, rim 3 and tire 4. This wheel structure may be any conventional one and therefore is not restricted to the particular type shown.

Figure 2:
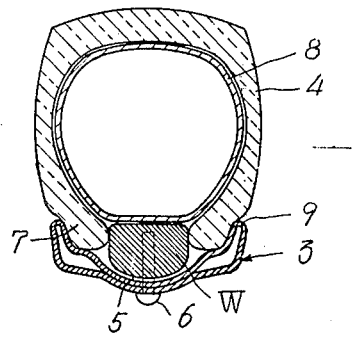
FIG. 2 is an enlarged section taken along the line II—II of FIG. 1.
Figure 5:
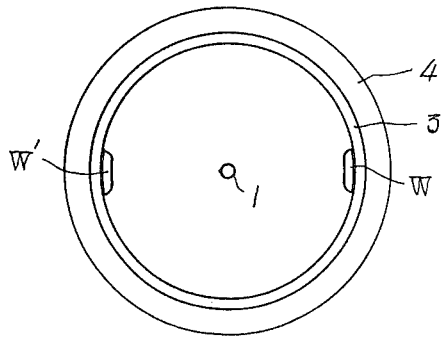
FIG. 5 is a view similar to FIG. 1 but showing a modification.

The important and essential feature of the invention is in the provision of a plurality of spaced weight blocks on the rim. It is necessary that these weights are arranged diametrically opposed or symmetrically in respect of the center of the wheel as shown. Although it is possible to mount these blocks W and W′ on the inner or exposed circumferential wall as shown in FIG. 5, it is preferable to mount the same within a circumferential or annular recess of the rim as shown in FIGS. 1 and 2. Referring to FIG. 2, the weight block W is inserted in the annular or circumferential recess 5 and may be fixed therein by any suitable manner. Thus the weight block W may be fixed in the recess 5 by applying an adhesive therebetween or the weight W may be fixed in place by means of a screw extending through the rim into the body of the weight. It is necessary that the width of the block W is such that there is left between the side wall of the block W and the inner side wall of the rim recess a space for receiving a bead portion 7 of the tire 4 wall shown in FIG. 2. The height of the weight W is so selected that it would not project so much from the recess as to unduly interfere with the tube 8. Usually the weight W is so dimensioned that it would not project over the level of the bead top 9 of the rim 3. It will be understood that the weight W may be mounted similarly on the rim of a solid or tubeless tire wheel instead of the usual pneumatic tire wheel as shown.

The weight block is usually elongated in the shape but the particular dimension may be varied depending upon the material (particularly specific gravity thereof) thereof, size of the wheel, number of the weights to be mounted. Of course, it is preferable that the block is as small as possible provided it has a desired weight. Taking as an example of a bicycle or auto-bicycle weight of a standard diameter (i.e. 26 inches) provided with two or a pair of weights W and W′ of this invention, a satisfactory result would be obtained if each of the weights is about 100–150 grams. In this case the weight block may be for example 10–15 cm. in length, 1–1.5 cm. in width and 0.9–1.1 cm. in height. Any suitable material, e.g. stone, metal, alloy, etc. may be used as the weight block provided that a desired weight is obtained. Examples of the material are zinc, tin, lead, iron, steel and an alloy of 0.1% antimony, 0.5% tin and balance zinc. It is also preferable that the blocks W and W′ are substantially equal in weight.

Figure 3:
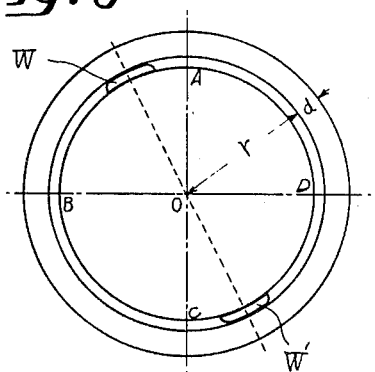
FIGS. 3 and 4 are respectively schematic views of a wheel of this invention to explain the working feature of the wheel.
Figure 4:
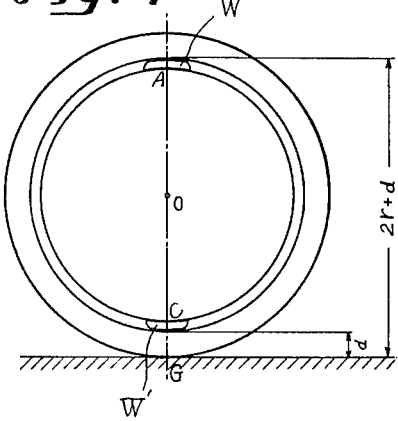

By the attachment of these weight blocks on a wheel in accordance with this invention, both the moment of inertia and rotary moment of the wheel is increased so that the bicycle or auto-bicycle, when driven by a given force, is more smoothly accelerated and driven. This may be theoretically explained as follows:

Referring to FIGS. 3 and 4, the letter "$r$" indicates the radius of the rim 3 and the letter "$d$" indicates the radial thickness of the tire 4. It is seen that the contribution from the rotational moment of inertia of the wheel due to the weight blocks is $2mr^2$ where $m$ is the total mass of the weight blocks. The weight blocks therefore act to stabilize the acceleration of the bicycle by the well known flywheel effect. Consequently, in accordance with the Newton's first law, the bicycle provided with this wheel would increase by $2m_2r^2$ in the resistance to changes in external forces (e.g. wind, frictional resistance, rate of climb etc.).

Due to the above mentioned increase in or addition of moment of inertia and rotary moment the bicycle (or auto-bicycle) is accelerated smoothly and can be driven with a smaller variation in applied foot pedal power. The further advantages of the device of this invention are that the weight blocks may readily be mounted on any existing bicycle wheel rim, the blocks are simple in construction and are inexpensive, that there is no increase in the external resistance because the blocks are mounted on the rim, and that there is no difference in appearance due to the mounting of the weight blocks.

Although two (a pair) weight blocks are mounted on the wheel rim in the embodiment shown it will be understood that two or more pairs of weight blocks may be mounted on a wheel rim if desired. It is possible to mount the weight blocks on any one or both of the wheels of a bicycle or auto-bicycles.

What I claim is:

In a bicycle wheel of the type including a circular rim for mounting a tire in an outwardly facing circumferential recess for receiving the bead of the tire, means for increasing the rotary moment of inertia of the wheel comprising two solid metal weight blocks, means mounting the blocks within said recess in diametrically opposed positions about the circumference thereof, each of said weight blocks having a mass of from about 100 to 150 grams and formed with one dimension narrower than the recess so that when mounted they are spaced from the wall of the rim recess sufficiently to allow the bead of a tire to freely pass between the weight blocks and the rim wall, and said weight blocks further formed with a height less than about the distance from the floor of the recess to the top of the rim so that the weight blocks do not project beyond the top of the rim wall.

References Cited by the Examiner

UNITED STATES PATENTS

| | | | |
|---|---|---|---|
| 1,857,144 | 5/1932 | Eger | 301—5 |
| 2,272,801 | 2/1942 | Hawrylasz | 301—5 X |
| 2,393,494 | 1/1946 | Hale | 152—401 |
| 2,986,189 | 5/1961 | Lindley | 152—158 |
| 3,150,704 | 9/1964 | Daw | 152—400 |

FOREIGN PATENTS 134,346   7/1933   Austria.

BENJAMIN HERSH, *Primary Examiner.*

ARTHUR L. LA POINT, A. HARRY LEVY, *Examiners.*

R. J. JOHNSON, *Assistant Examiner.*